United States Patent [19]

van Engelenburg et al.

[11] 4,292,280

[45] Sep. 29, 1981

[54] SEPARATION OF ANIONIC METAL COMPLEXES BY OXYGEN CONTAINING POLYMERS

[75] Inventors: Bertus van Engelenburg; Hendrik F. van Wijk, both of Zeist, Netherlands

[73] Assignee: Nederlandse Centrale Organisatie voor Toegepastnatuurwetenschappelijk Onderzoek, The Hague, Netherlands

[21] Appl. No.: 9,454

[22] Filed: Feb. 5, 1979

[30] Foreign Application Priority Data

Feb. 9, 1978 [NL] Netherlands .......................... 7801516

[51] Int. Cl.$^3$ .......................... C01G 9/04; C01G 3/05; C01G 53/09

[52] U.S. Cl. ...................................... 423/24; 423/100; 423/139; 423/DIG. 14; 423/7; 521/25; 521/174; 560/156

[58] Field of Search .................... 210/37 B; 423/7, 24, 423/100, 139, 658.5; 521/25; 560/157

[56] References Cited

U.S. PATENT DOCUMENTS 3,725,527  4/1973  Yamamura .......................... 423/139

FOREIGN PATENT DOCUMENTS 2526247  12/1976  Fed. Rep. of Germany .
2732800   1/1978  Fed. Rep. of Germany .
1129733   1/1957  France .
2143083   2/1973  France .
 717370   6/1972  Netherlands .

OTHER PUBLICATIONS

Braun et al., "Polyurethane Foams and Microspheres in Analytical Chemistry", *Analytica Chimica Acta*, 99 (1978) pp. 1–36.
Braun et al., "Cellular and Foamed Plastics as Separation Media", Talanta vol. 22 (1975) pp. 699–705.
Bowen "Absorption by Polyurethane Foams; New Method of Separation", J. Chem. Soc. (A) (1970) pp. 1082–1085.
Chemical Abstracts vol. 61 (1964) #2455.

*Primary Examiner*—Brian E. Hearn
*Attorney, Agent, or Firm*—Hammond & Littel, Weissenberger and Muserlian

[57] ABSTRACT

A process for the separation of metals in which a mixture of metal derivatives is converted into anion complexes by means of a complexing anion such as, for example, a halide, thiocyanate, sulphate, nitrate, or the like said anion complexes are bound to a solid, non-soluble polymer, containing oxygen bonded to carbon which is converted into a polyoxonium compound by means of the complexing liquid medium used. The complexes are separated by selective absorption and/or elution over the polymer using suited $H^+$ ion concentrations and/or complexing anion concentrations.

8 Claims, No Drawings

SEPARATION OF ANIONIC METAL COMPLEXES BY OXYGEN CONTAINING POLYMERS

The present invention relates to a process for the separation of metals by conversion of a mixture of metal derivatives in anion complexes and binding said complexes to an organic compound.

Such processes are known; in said processes anion complexes of heavy metals are extracted with liquid organic compounds such as ethers, ketones, esters, etc. For instance the iron III chloride complexes can be extracted from an aqueous medium by means of methylisobutylketone or by means of diisopropyl ether; see for instance Claassen A, Basting L. Z. Anal. Chem. 160 403 (1958) and Dodson R, W., Forney G. J., Swift E. H., J.Am.Chem.Soc. 58 2573 (1936).

It is usual in the art of hydrometallurgy to extract the metals from an aqueous solution by means of a suitable mixture of organic solvents. However, said solvent extraction has some disadvantages, such as, the following:

1st The performance of a multistage-extraction process generally requires a more elaborate and advanced apparatus and thus requires a high investment.
2nd The reliability of an extraction process is impaired by the emulsification, that can occur in the presence of surfactants.
3rd The solubility of the organic extraction liquid in the aqueous phase causes environmental pollution.
4th In case of subsequent use of more than one extraction liquid mutual pollution of said extraction liquids via the aqueous phase cannot be avoided.

Surprisingly it has now been found, that said disadvantages can be removed by binding the anion complexes of the metals to a solid polymer that is insoluble in the medium used and contains oxygen bonded to carbon and which is converted in the acid medium used into a polyoxonium compound and by subsequent selective elution of the metal compounds by decrease of the hydrogen ion concentration and/or decrease of the complexing anion concentration.

Surprisingly it has been found, that also solid insoluble polymers containing oxygen bonded to carbon are capable to bind some anion complexes.

Of course said bonding to a solid polymer cannot be a question of solvation of the anion complexes, as is the case with the extraction with a liquid solvent, so that a different binding mechanism should be active, which appears to show a different selectivity.

The binding to polymers occurs by protonization of the polymer by the hydrogen ions in the medium used and some anion complexes adhere hereto.

Of course the polymer should remain insoluble and solid during the protonization and the binding of the anion complexes to the polymer. Thus only high molecular polymers or polymers which are crosslinked by copolymerization with an auxiliary substance or by different means can be used.

Very suited are polymerisation products of ethylene oxide and/or propylene oxide and/or butylene oxide with a polyhydroxy-compound and a diisocyanate (toluene diisocyanate, for example). This yields crosslinked solid polymers having a porous structure which are known under the name "polyetherurethanes" and which are commercially available (for example, Voranol ®, available from Dow Chemical). Said polymerization products can be adapted to the use in a column by a simple mechanical treatment, such as milling.

Although it is obvious that it is economically attractive to use such commercial products for the binding of metals it is also possible to make the polyethers insoluble by other methods, such as by co-valent binding to polystyrol, etc.

It is characteristic for the formation of a bond between a metal and the polymer that both the medium and the polymer should "condition" the metal ion. The polymer is then converted to a polyoxonium compound and the metal to an anion complex.

Since the binding of metals to the polymer proceeds according to a mechanism different from that of the solution of metal complexes in organic solvents, different selectivity rules hold for the binding to the polymers.

Iron and/or zinc are bonded to 30 percent by weight iron chloride and/or zinc chloride, respectively, by a polyether urethane (polyethylene oxide and polypropylene oxide in a molar ratio 1:9 copolymerised with toluene diisocyanate) for instance.

Iron chloride is bonded from 6 M hydrochloric acid and zinc chloride is not bonded.

Copper chloride is bonded at no hydrochloric acid concentration. Copper thiocyanate, however, is already strongly bonded together with nickel, chromium, iron, zinc, manganese, cadmium, cobalt, etc., in 1 M thiocyanate to the above polymer.

A gradual decrease of the thiocyanate concentration is obtained by rinsing with water after the binding of said metals, said metals are thus subsequently eluted and thus separated.

A general embodiment of said process which is very beneficial is the following:

The metal mixture in question is dissolved as an anion complex with a suitable complexing anion, such as a halide, thiocyanate, sulphate, nitrate, etc. The polymer in question is brought into the oxonium form by treatment with a solution of a sufficient high $H^+$ ion-concentration.

The metal solution is subsequently contacted with the polymer, e.g., by passing the solution through a column or a bed of the polymer, thus binding one or more of the metals from the solution to the polymer.

After that the polymer is loaded with the metals the metals are selectively freed from the polymer by stepwise or continuous decrease of the $H^+$ ion-concentration and/or the complexing anion concentration.

The decrease of said concentrations of course should be performed such that the metals are subsequently freed.

It will be clear that it is also possible to accomplish a selective binding of one specific metal ion by a suitable choice of the acid strength and/or concentration of the complexing anion.

After the elution of the metals from the polymer said polymer can be re-used.

The complexing agent is preferably chosen such that the said anion complexes are formed at a reasonable high concentration of the complexing agent and are decomposed at a somewhat lower concentration (complexes with a poor stability).

In this respect halides and thiocyanates are very suitable for nearly all heavy metals, such as iron, copper, cobalt, manganese, zinc, cadmium, gold, etc.

Complexing agents such as nitrate and sulphate are less generally applicable and more suited for special purposes such as the binding of anion-complexes of urane, thorium, cerium, etc.

The above is illustrated by means of the following Examples. However, the present invention is not limited to these Examples.

EXAMPLE 1

The recovery of iron III from metal hydroxide slurries.

A metal hydroxide slurry containing 18 weight % of iron III, 10 weight % of copper and 0.1 weight % of nickel is dissolved in hydrochloric acid to a concentration of about 1 mole metal and 8 moles hydrochloric acid per liter.

Said solution is passed to the top of a vertical column of 25 cm×0.4 cm$^2$ filled with 0.4 g polyether urethane grains.

Said grains are obtained by milling a product formed from polypropylene oxide, polyethylene oxide (ratio 9:1) containing some procents of a triol and copolymerized to an unsoluble porous mass using toluene diisocyanate.

During depercolation of said solution over said polymer only iron III is bonded and from the bottom of the column an iron-free solution of copper and nickel in 8 M hydrochloric acid is withdrawn.

After a full loading of the column with iron, which appears from the withdrawing of iron from the bottom of the column (passing through), the intermediate volume of the polymer grains is liberated from unbonded iron by elution with about 10 cm$^3$ 8 M hydrochloric acid. It is found that the polymer has bonded about 44 mg iron III (11 weight % of iron or 30 weight % of iron chloride).

The bonded iron chloride is subsequently eluted with about 10 cm$^3$ of a very dilute solution of hydrochloric acid (concentration beneath 0.5 M).

After the elution of the iron the column can be re-used.

EXAMPLE 2

The recovery of iron from used mordant baths of the thermic zinc coating.

Said baths contain high concentrations zinc and iron III in a chloride-medium.

A mordant bath containing 130 g of zinc per liter and 88 g of iron per liter was adjusted at 6 M hydrochloric acid by the addition of concentrated hydrochloric acid. Subsequently the iron II was oxydized to iron III by means of chlorine.

Percolation of that liquid over a column as described in Example 1 gives a selective bonding of the iron to the polymer, such yielding an iron-free zinc chloride solution at the bottom of the column.

It is found that the column can accept about 10 weight % of iron in 6 M hydrochloric acid. After a total load of the column the iron can be eluted with water.

EXAMPLE 3

The separation of iron, zinc and copper.

A solution containing 20 mg iron, 20 mg of zinc and 20 mg of copper is adjusted to 6 M hydrochloric acid and subsequently passed through a column as described in Example 1.

In 6 M hydrochloric acid only iron III of said three metals is bonded. The column is subsequently washed with about 10 cm$^3$ 6 M hydrochloric acid. Iron III is eluted from the column with about 10 cm$^3$ water and received separately.

The de-ironed solution passed through the column is adjusted to 8 M hydrochloric acid and repassed through the column. Zinc is bonded from that medium and thus an iron-free and zinc-free copper chloride solution is obtained from the column. Zinc is eluted from the column by means of water.

EXAMPLE 4

The separation of metals in thiocyanate medium.

A solution containing 10 mg of iron III, 10 mg of cobalt II and 10 mg of nickel II is brought into a 2 M potassium thiocyanate medium. The solution is adjusted to 0.5 M of hydrochloric acid (final volume about 10 cm$^3$).

Said three metals are all bonded quantitative to the polymer, such that the auxiliary medium (2 M potassium thiocyanate and 0.5 M HCl solution) is recovered from the bottom of the column.

Said three metals bonded to the column can be recovered by elution with water or 0.01 M potassium thiocyanate.

Thiocyanate still remaining in the column causes a gradual decrease of the thiocyanate-ion-concentration causing a subsequent elution of the metals in the following sequence: nickel II, cobalt II and iron III, which are eluted and received separately.

EXAMPLE 5

Binding of gold III.

A solution of 5.8 mg of NaAuCl$_4$2H$_2$O in 10 ml 1 M hydrochloric acid is contacted with 0.1 g of polyurethane grains (composition see Example 1).

After that an equilibrium has been reached it is found that the gold-contents of the solution is decreased from 290 p.p.m to 70 p.p.m. corresponding with a gold-contents of 2.2 weight % of gold by the polymer.

EXAMPLE 6

Bonding to urane VI.

A solution of 1.00 g urenylacetate-dihydrate in 100 cm$^3$ 8 M nitric acid is brought into contact with 1.0 g of polyether urethane grains (composition see Example 1). It is found that the polymer binds from the above mentioned medium 12 weight % of urane VI.

EXAMPLE 7

Bonding of iron III to polybutylene oxide urethane.

1 g of polybutylene oxide urethane obtained by copolymerisation of butylene oxide and toluene diisocyanate is contacted with 100 cm$^3$ of a solution of 3 g of anhydrous ferricchloride in 6 M hydrochloric acid. It is found that said polymer binds from the above mentioned medium 5 weight % of iron III, what can be eluted from the polymer with 50 cm$^3$ of water.

We claim:
1. A process for the separation of iron and zinc from a mixture of iron, zinc, and copper, which comprises the steps of:
 (a) dissolving the mixture of iron, zinc, and copper in 6 M hydrochloric acid solution;
 (b) contacting the solution from step (a) with a solid, insoluble polymer containing oxygen bonded to carbon to cause chloride complexes of iron III to bond to the polymer;

(c) recovering iron-free solution;
(d) recovering iron III chloride by contacting the polymer from step (b) with water;
(e) adjusting the iron-free solution from step (c) to comprise 8 M hydrochloric solution;
(f) contacting the solution from step (e) with the polymer to cause zinc chloride complexes to bind to the polymer;
(g) recovering iron-free and zinc-free, copper chloride solution; and
(h) recovering zinc chloride by contacting the polymer from step (f) with water.

2. The process of claim 1, wherein the polymer is insoluble due to copolymerization with one or more auxiliary substances.

3. The process of claim 1, wherein the polymer is insoluble due to copolymerization with diisocyanate.

4. The process of claim 1, wherein the polymer is polybutylene oxide urethane.

5. A process for the separation of iron III, cobalt II, and nickel II from a mixture thereof, which comprises the steps of:
(a) dissolving the mixture of metals in a 2 M potassium thiocyanate medium;
(b) adjusting the solution from step (a) to 0.5 M of hydrochloric acid;
(c) containing the solution from step (b) with a solid, insoluble polymer containing oxygen bonded to carbon to cause chloride complexes of iron III, cobalt II, and nickel II, respectively, to bond to the polymer; and
(d) rinsing the polymer in step (c) in several steps with water or 0.01 M potassium thiocyanate to respectively recover nickel II, cobalt II, and iron III.

6. The process of claim 5, wherein the polymer is insoluble due to copolymerization with one or more auxiliary substances.

7. The process of claim 5, wherein the polymer is insoluble due to copolymerization with diisocyanate.

8. The process of claim 5, wherein the polymer is polybutylene oxide urethane.

* * * * *

UNITED STATES PATENT AND TRADEMARK OFFICE
CERTIFICATE OF CORRECTION

PATENT NO. : 4,292,280
DATED : September 29, 1981
INVENTOR(S) : Bertus van Engelenburg et al.

It is certified that error appears in the above—identified patent and that said Letters Patent is hereby corrected as shown below:

In the ABSTRACT, line 5, "like said" should read -- like. Said --.

Column 6, line 8, "containing" should read -- contacting --.

Signed and Sealed this

Twentieth Day of April 1982

|SEAL|

Attest:

Attesting Officer

GERALD J. MOSSINGHOFF

Commissioner of Patents and Trademarks